Oct. 11, 1927.

G. E. HOWARD 1,645,054

METHOD OF AND APPARATUS FOR FORMING SHEET GLASS

Filed Oct. 13, 1926     3 Sheets-Sheet 1

INVENTOR
George E. Howard
By Robson A Brown,
Attorney

Oct. 11, 1927.
G. E. HOWARD
1,645,054
METHOD OF AND APPARATUS FOR FORMING SHEET GLASS
Filed Oct. 13, 1926  3 Sheets-Sheet 2
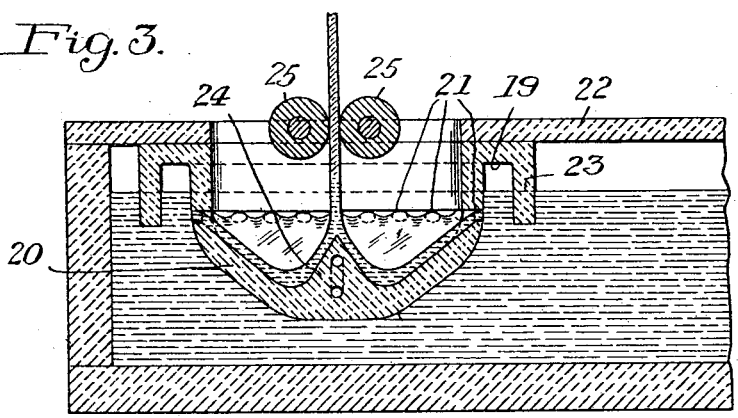
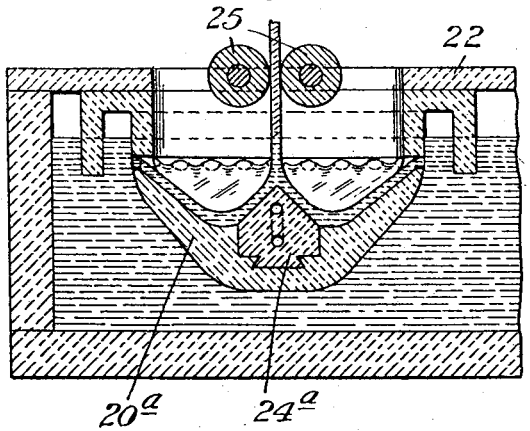
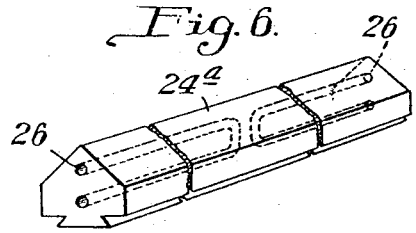
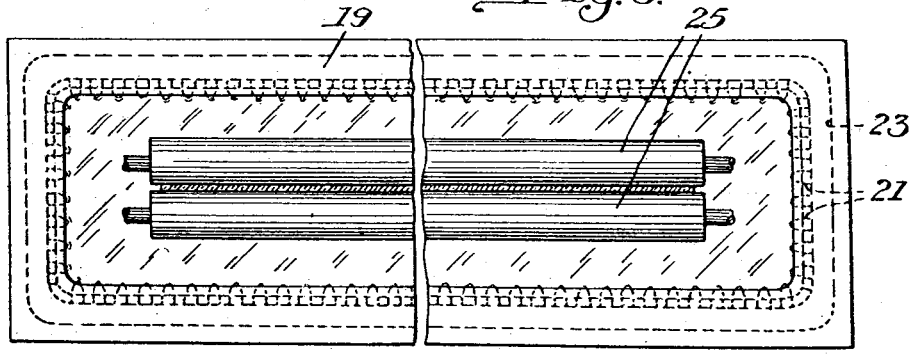
INVENTOR
George E. Howard
By Robert S. Brown
Attorney Patented Oct. 11, 1927.

1,645,054

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed October 13, 1926. Serial No. 141,278.

My invention relates to a method and apparatus for drawing glass, and more particularly to the formation of sheet glass known as window glass.

My invention has for one of its objects the provision of means for reducing defects on the surface of the glass and particularly for localizing certain of those defects to a smaller area than is possible under the present systems.

Another object of my invention is to avoid the necessity for extreme sensitiveness of control, by providing a method and apparatus which will enable sheets to be drawn with uniform thickness and more nearly independent of the distribution of the cooling effect, especially on the upper portion of the sheet before it is set.

Another object of my invention is to improve the character of the surface of the glass sheet finally drawn.

Still another object is to provide for increase in the rate of draw without holding large quantities of glass at a low temperature, and thus overcome the tendency of the glass to devitrify.

Still another object is to maintain the straightness or planeness of the sheet drawn and to do so without such sensitive attention to the cooling conditions as is necessary in the prevailing methods.

Figure 1:
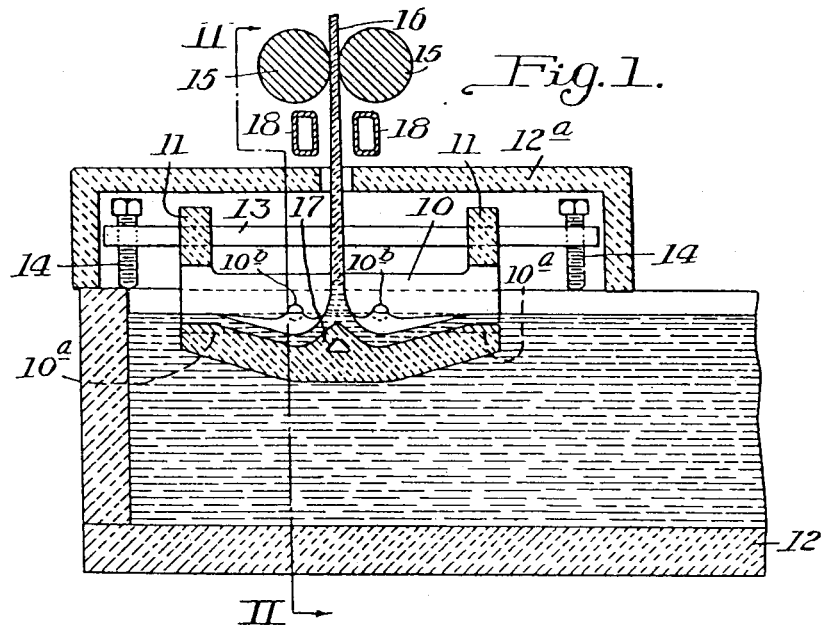
Figure 2:
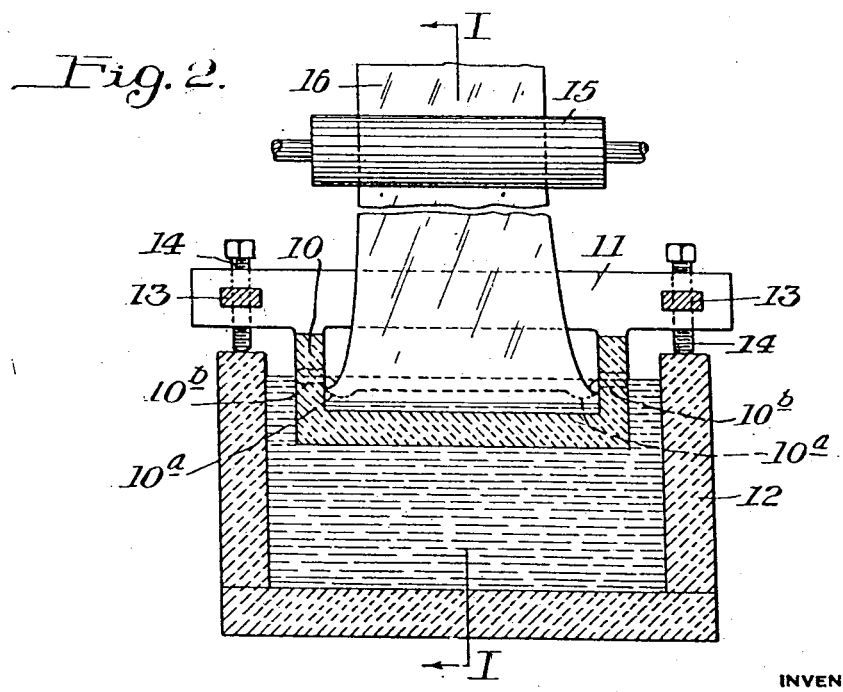
Figure 7:
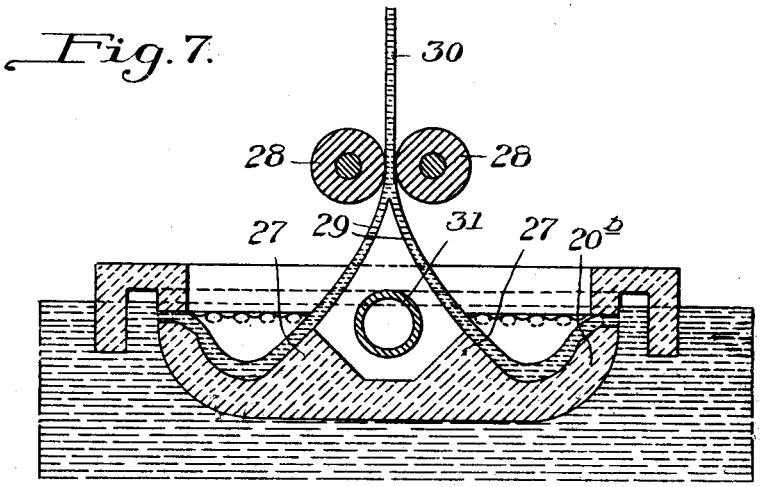
Figure 8:
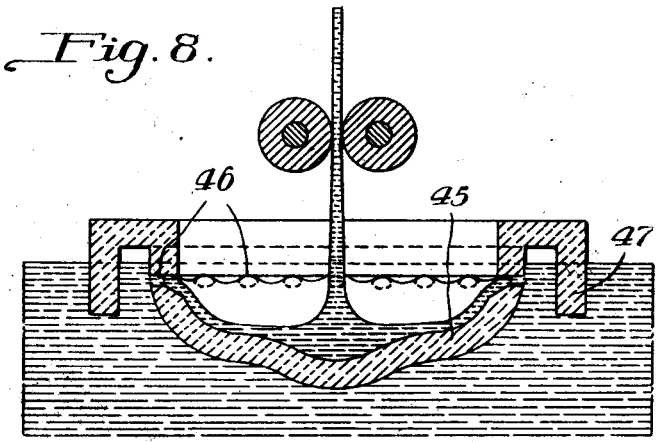

Some of the forms of apparatus by which my invention may be practiced are shown in the accompanying drawing, wherein Figure 1 is a longitudinal sectional view of a forehearth or other glass container, to which one form of my improved form of apparatus has been applied, the section being taken on the line I—I of Fig. 2; Fig. 2 is a view taken on the line II—II of Fig. 1 with a portion of the apparatus removed; Fig. 3 is a view similar to Fig. 1, but showing a modified form of drawing ring; Fig. 4 shows still another form of drawing ring; Fig. 5 is a plan view of the apparatus of either Fig. 3 or Fig. 4; Fig. 6 is a perspective view of a portion of the drawing ring of Fig. 4; Fig. 7 is a view showing a third form of drawing ring which I may employ, and Fig. 8 shows still another modification of drawing apparatus which may be employed.

Referring now to Figs. 1 and 2, 10 represents a drawing ring or basin which has upstanding ears or lugs 11 and which is immersed in the glass contained in the tank or forehearth 12. This drawing ring or basin may be floated in the glass by constructing it so that its buoyancy exceeds that of the glass displaced (not illustrated) or, as shown in the illustration, it may be of greater weight than the amount of glass displaced, and supported as shown, by means of bars 13 that extend through openings in the ears 11 of the ring and over the tank walls, and are regulated as to height by set screws 14. In case the ring is designed to function as a floater, the depth of immersion thereof in the glass would be governed by weights placed upon it; regulation being effected by putting on and taking off weight, as required.

Regulation of the amount of glass flowing into the floater 10 is necessary, in order to maintain an even thickness of sheet, and it is important that the glass flow be maintained at a uniform rate. It is therefore necessary that the distance between the edge of the floater over which the glass flows and the top surface of the glass be a fixed distance. This can be done by adjusting the screws 14 manually, or an automatic means may be provided by which the raising and lowering of this edge may conform to the variation in the level of the surface of the glass in the tank.

The ring 10 is shown as immersed for a certain distance below the surface of the glass in the tank. When so placed there will be a flow of glass from said surface of the glass downward and over the interior surface of the floater toward a wedge-like portion or rib 17, which is shown as having an opening into which can be introduced either heating or cooling elements, as may be desired. When sufficient glass has been collected in the interior of the ring, a glass sheet can be started upwardly in any well known manner, by first inserting a bait and drawing it upwardly, followed by the sheet of glass 16. Thereafter the operation can be continuous.

Rollers 15, preferably covered with asbestos or other heat-resisting material, bear against the opposite sides of the sheet 16. By mechanically driving these rollers an upward drawing or traction is placed upon the sheet, and it continues to rise as in well known sheet drawing methods. When it has been raised upwardly through suitable annealing chambers (not shown) it can be cut off and placed in stock. It is necessary that the glass sheet, especially on its surface, be sufficiently hardened by the time it contacts with the rollers that no marking or other defects are caused thereby.

Immediately above the floater is a cover 12ª which is preferably of some refractory material and is provided with a slot through which the glass may pass. This cover serves to protect the surface of the glass from the influence of currents of cooler air from the outside and tends to keep the glass in a homogeneous state. The interior of this cover will be incandescent at the temperatures ordinarily used in drawing glass. Directly above the slot are cooling devices 18 which may consist of hollow metallic members through which water or other cooling medium may be passed. These increase the rate of cooling and reduce the amount of stretching of the sheet 16 which would take place if these cooling members were omitted and they permit the rolls 15 to be placed somewhat closer to the bath. They also serve to keep away currents of air from the surrounding atmosphere which may strike the plate unevenly and result in irregular thickness.

There is an unbroken connection between the surface of the glass in the ring 10 and the surface of the glass in the container 12. This surface is the best surface known, i. e., a fairly stationary pool of glass exposed to even temperatures and having a body sufficient to retain the stability necessary in work of this kind. The surface of this glass in the tank passes into the ring and thence outwardly in the sheet, without touching any object, thus insuring superior quality in said surface.

Inasmuch as the glass and the lower part of the ring 10 are obviously at the same temperature, there is little difference in temperature between the surface of this glass and the interior, and the cover 12ª insures that this condition is maintained fairly well up to the point at which the upward movement of the sheet 16 begins.

In bodies of molten glass, certain irregularities occur in practice, and there are zones where the glass is of a different nature from the surrounding glass, owing to irregularity in the materials or in the feeding thereof into the melting end of the furnace. There are occasionally bubbles which are not refined out and which flow through to the drawing point. In the ordinary drawing of window glass certain difficulties appear, especially when these patches of different natured glass or bubbles touch and attach themselves to refractory materials. Quite frequently the patches or bubbles will adhere on one side to the refractory material or other obstruction in their path, while the other side will float along and be drawn up into the finished glass. Frequently where such phenomena occur the patch or bubble will remain attached at one end for an indefinite time and the other end will be drawn up an indefinite distance with the plate, thus causing defective surface for a large area of finished plate. In the present instance the tendency for such lodgment is remote, as the glass flows downwardly in entering the ring 10, the flow thus tending to push along these particles; whereas, if the glass is drawn upwardly and subjected only to the tensional force, the effect of such tension rapidly diminishes in directions away from the axial line of the plate.

In the present embodiment, these particles will be flowed or pushed by the gravity action of the glass to the lowermost points or pools on each side of the wedge 17 and will thus be drawn up into the sheet 16 as a whole instead of being stretched out indefinitely. Bubbles or patches of defective glass present on the surface of the glass will be drawn up into the sheet, but they will be localized and will produce defects over much smaller areas. The exception to this would be in the case of those particles or bubbles which would strike the outer edges of the glass and the inide edge of the floater, and there might be lodgment of these particles to some degree at this point, in which case such defects, if stretched as in the present practice, would be at the edges of the sheet and not at points in the interior. These edges are cut off as waste in any case, so that their presence will not cause a loss in the marketable portions of the plate. Even in this latter case the tendency to lodge will be less in the case of the embodiment shown in Fig. 1, owing to the combined effect of flowing and drawing, under which combined forces, the sheet is produced in my invention.

The wedge 17 is preferably supplied in its interior with a cooling agent whose effect will be to cool the wedge locally and thus cool the interior of the plate rather than its surface. In consequence, the axis of the drawn plate will tend to remain straight or conform to the ridge of the wedge for two reasons.

1. That as the glass gets colder the drawing tension increases and it will tend to work toward the colder point:

2. Any tendency to shift to the right or the left will result in an increase of tension on the opposite side of the plate and will lessen the effect of the flowing force, and the combined action of these two forces will thus automatically keep the plate at the center line of the wedge.

Further, any tendency of the glass to draw from one pool more than the other will reduce the depth of the glass in that pool and it will naturally be supplied by the other pool which will be building up its level at its lowermost point.

It is thus seen that the amount of glass to be drawn upwardly, and therefore the thickness of the sheet, will depend upon the amount flowing over the submerged edges of the floater, provided this flow is kept within the limits at which the glass in the sheet 16 will support itself at the speed at which the rollers 15 are driven. The wedge 17 will cool the interior of the glass rather than the surface, and such cooling, within limits, can be arranged so that a rapid rate of drawing can be effected without cooling the surface of the glass to such extent as to cause devitrification.

In the usual methods of drawing glass it is the temperature of the surface of the glass at the drawing point and in the body of the glass which determines the thickness of glass in the sheet at any certain rate of travel of rollers. I do not depend so greatly upon the temperature, as the amount of glass going into the sheet is determined not so much by the temperature of the glass drawn upwardly as by the amount of glass flowing over the submerged edges of the drawing ring. Therefore, the thickness of the sheet will be directly in proportion to the amount of said submersion, other things being equal.

After the glass passes up through the slot in the cover 12ª it is still stretching and flowing, and it is here that the cooling means 18 are supplied relatively close to with the glass and rapidly chill the glass to a point where flowing and stretching practically cease. The glass is thus not exposed to currents of air at any point in which it is plastic and where the cooling is liable to affect its thickness.

There is a tendency for glass to draw away at its edges when drawn from an open pool until it finally becomes a round column of glass. This tendency is overcome in the present invention owing to the fact that the edges of the glass tend to adhere to the floater 10. Also, the edge of the floater over which the glass flows may have depressions 10ª which serve to feed additional glass to the edges of the sheet and thus maintain the width of the plate. Holes 10ᵇ may also be provided in the ends of the ring 10, to cause feeding of additional glass to the edges of the sheet.

Where glass of considerable thickness is drawn and it is necessary to keep the body of glass in the tank 12 at low temperature, it may be found desirable to heat the rib 17 instead of cooling it, and cooling and heating fluids may be passed therethrough alternately, or even simultaneously, as conditions may render desirable. As to the introduction of cooling and heating fluids simultaneously, it is necessary to introduce a temperature-controlling medium into the rib in sufficient volume to fill the passage, because a small volume of fluid would reach the temperature of the ring before traveling a sufficient distance within the rib, while a large volume of liquid at a given temperature might cause a too great change in the temperature of the rib. By combining two streams of fluid and controlling their relative proportions, a full volume of cooling fluid, at exactly the temperature desired, may be provided.

Referring to Figure 3, I show a ring or floater 20 which has its bottom portion of greater inclination than the bottom of the ring 10. The upper portion 19 of the floater is provided with a depending flange 23 that extends below the surface of the glass and serves as a skimmer, to prevent floating particles from entering the ring. The molten glass enters the ring 20 through openings 21 in the sides of the ring. A cover 22 serves to shield the glass in the tank and to hold the floater 20 in place, while the sheet is drawn by a pair of rollers 25. The floater 20 is provided with a rib 24, of wedge-like form, through which cooling fluid may be passed from each end, as indicated by the lines 26 of Fig. 6. Each stream of cooling medium will be passed through the rib for substantially only one-half of its length and reversely directed toward its point of entry, thus permitting of more uniform cooling of the rib and enabling me to vary the degree of cooling at various portions of the wedge.

Figure 4 shows an embodiment similar to Fig. 3, except that the cooling wedge is made of a separate piece and may be made of different material from that constituting the main body of the floater 20ª.

Figure 6 represents this wedge in detail, and in this particular illustration openings 26 are provided and cooling means may be passed through the upper opening, turn a bend, and return through the lower opening. This material may be of some metallic substance which will not mark or color the glass, such as nichrome steel. Such materials can be machined and kept straight with less difficulty than refractory materials which may warp in burning. There is an advantage in employing the cooling medium in this manner, as the greatest amount of cooling will be at the point where the cooling material enters the opening 26, Figure 6, and these points will be where the edges of the sheet are drawn, or close thereto, and the sheet will be progressively warmer toward its center. The tendency of the sheets to narrow in drawing is thus reduced. This grading of the cooling must be carefully done and must not be too extreme, as there will be a tendency for it to affect the thickness of the plate, and it is expected that the proportions of these wedges will be so designed as to give only sufficient additional cooling at the edges to maintain the plate against any tendency to otherwise narrow.

Referring to Fig. 5, which is a plan view, it will be seen that the openings 21 are in all four sides of the drawing ring; also that the skimmer 23 extends on all four sides. These openings 21 need not be as numerous at the ends as on the sides, because only sufficient glass to maintain the edges of the sheet need be fed in at the ends of the ring.

Figure 7 shows a slight variation in the cooling of the streams 29 which form the sheet 30. The ring 20$^b$ is shown as provided with two ribs, 27, between which a pipe 31 for a cooling or a heating medium is disposed. The sheets 29, as they are drawn upward by the rolls 28, fuse or coalesce to form a completed sheet 30.

Figure 8 shows another embodiment, where the principle of combining the flowing and the drawing is employed, but wherein the mid portion of the drawing ring is depressed, instead of the pool being partially divided as in some of the other figures. In this embodiment the glass is kept straight by the flowing into the pool from opposite sides, in equal amounts, rather than by any other factor, as the temperature of the pool, instead of being colder at the interior of the glass, will be the reverse, as in the present system of drawing glass from a pool or bath.

The floater 45 is shown as having submerged openings 46 through which glass may enter, and a skimmer 47, but it is obvious that a ring or floater arranged so that the glass will flow over the edge thereof, as shown in Fig. 1, and without the use of a skimmer, can be employed for collecting a pool.

I claim as my invention:

1. The method of forming sheet glass, which comprises setting up a flow of molten glass downwardly from opposite directions to opposite sides of a dividing member, to form a pool, and drawing a sheet of glass from said pool.

2. The method of forming sheet glass, which comprises flowing streams of molten glass downwardly from opposite directions into contact with the sides of a wedge-like member, cooling the interior of said member, uniting said streams and continuing the movement thereof in the form of a sheet.

3. The method of forming sheet glass, which comprises flowing streams of molten glass downwardly from opposite directions into contact with the sides of a wedge-like member, controlling the temperature of said member, uniting said streams, and continuing the movement thereof, in the form of a sheet.

4. The method of forming sheet glass, which comprises creating two streams of molten glass by gravity flow, uniting said streams, and continuing movement thereof upwardly in the form of a sheet.

5. The method of forming sheet glass, which comprises creating two streams of molten glass, uniting said streams cooling the space between the streams adjacent to their line of juncture, and continuing movement thereof in the form of a single sheet.

6. The method of forming sheet glass, which comprises drawing a sheet upwardly by rolls disposed above a pool of molten glass, maintaining the temperature surface of the sheet of glass at a point above said pool, and cooling the surface of the glass at a point between said rolls and the first named point.

7. The method of forming sheet glass, which comprises drawing a sheet from a pool of molten glass that is formed by flowing over the edge of a container which is immersed in a bath of molten glass, and regulating the flow of glass into the container by varying the depth at which the container is positioned in the molten bath.

8. The method of forming sheet glass, which comprises flowing glass from a molten bath, to form a pool, drawing a sheet from said pool, cooling the glass adjacent to said pool to such an extent as would determine the thickness of a sheet drawn from an open bath at a given rate, and restricting the flow of glass from said bath to the pool to an amount less than required to form a sheet of said determined thickness.

9. The method of drawing sheet glass, which comprises flowing a stream of molten glass downwardly from a bath of molten glass, maintaining an unbroken connection between the surfaces of the said bath and stream, and drawing the forward end of the stream of glass upwardly in the form of a sheet.

10. The method of drawing sheet glass, which comprises creating two streams of molten glass moving in directions inclined downwardly with respect to the horizontal, causing said streams to unite, drawing the united streams upwardly to form a sheet, and controlling the temperature of the united streams at a point beneath their line of juncture.

11. The method of forming sheet glass, which comprises directing a stream of glass downwardly and against each face of a member of wedge-like form, whose apex is uppermost, causing the said streams to unite at said apex, and continuing the upward movement of the glass, in the form of a sheet.

12. The method of forming sheet glass, which comprises directing two streams of glass downwardly from the surface of a pool of molten glass, continuing the movement of said streams in an upwardly inclined direction, uniting said streams, and continuing the movement thereof upwardly in the form of a sheet.

13. The method of forming sheet glass, which comprises submerging a drawing ring of dish-like form in a pool of molten glass, to permit flow of molten glass from the edges of said member to the bottom thereof, and drawing a sheet from a point adjacent to the bottom of said drawing ring.

14. The method of forming sheet glass, which comprises submerging a container having a depressed mid portion in a bath of molten glass, to cause the glass to flow from opposite edges of the container, toward said mid portion, under the action of gravity, and drawing a sheet from said mid portion.

15. The method of forming sheet glass, which comprises submerging a drawing ring having a depressed mid portion in a bath of molten glass, to cause the glass to flow toward said mid portion under the action of gravity, drawing a sheet from said mid portion, and controlling the temperature of the glass adjacent to the point of initial formation of the sheet.

16. Apparatus for forming sheet glass, comprising a drawing ring having a detachable rib of wedge-like form, and means for drawing a sheet of glass from molten glass at the sides of said rib.

17. Apparatus for forming sheet glass, comprising a container having a depressed portion toward which glass will flow from the exterior of the container when the container is partially immersed in a bath of molten glass, means for regulating the depth to which the container is placed in the bath of glass, and means for drawing a sheet from the glass which flows into the ring.

18. Apparatus for forming sheet glass, comprising a drawing ring of dish form for submerging in a bath of molten glass, so that the glass will flow toward the mid portion thereof, and means for drawing a sheet from said mid portion.

19. Apparatus for forming sheet glass, comprising a drawing ring of dish form for submerging in a bath of molten glass, so that the glass will flow toward the mid portion thereof, and means for drawing a sheet from said mid portion, the said ring being provided with a rib against the opposite sides of which the glass flows upon entering the ring.

20. Apparatus for forming sheet glass, comprising a drawing ring having a depressed mid portion, a rib member extending across the depressed portion, means permitting glass to flow downwardly against opposite sides of said rib when the ring is immersed in a bath of molten glass, and means for continuing movement of molten glass from said rib in the form of a sheet.

21. Apparatus for forming sheet glass, comprising a drawing ring having a depressed mid portion to which molten glass will flow when the ring is partially immersed in the glass, and means for drawing a sheet from the glass which flows to said mid portion, the point of withdrawal being normally below the level of the bath of molten glass.

22. Apparatus for forming sheet glass, comprising a drawing ring having a depressed mid portion to which glass will flow downwardly in streams from opposite sides of the ring, means for uniting said streams and continuing movement thereof as a single sheet, and means for controlling the temperature of the streams adjacent to the point of juncture thereof.

23. Apparatus for forming sheet glass, comprising a drawing ring having a depressed mid portion to which glass will flow downwardly in streams from opposite sides of the ring, means for uniting said streams and continuing movement thereof as a single sheet, and means for controlling the temperature of the streams beneath the point of juncture thereof.

24. Apparatus for forming sheet glass, comprising means for directing two streams of glass downwardly from a bath of molten glass and for causing said streams to unite, and means for continuing movement of the united streams upward to form a sheet.

25. Apparatus for forming sheet glass, comprising means for directing two streams of glass downwardly from a bath of molten glass and for causing said streams to unite, means for continuing movement of the united streams upwardly to form a sheet, and means for controlling the temperature of the glass at a point adjacent to the point of juncture of the streams.

26. Apparatus for forming sheet glass, comprising a container having a depressed mid portion toward which glass will flow from the exterior of the container over the edges thereof when the ring is immersed in a bath of molten glass, and means for drawing a sheet from the glass which collects at said mid portion.

Signed at Butler, Pa., this 17th day of Sept., 1926.

GEORGE E. HOWARD.